(12) United States Patent
Kostyushko et al.

(10) Patent No.: US 11,126,718 B2
(45) Date of Patent: Sep. 21, 2021

(54) METHOD FOR DECRYPTING DATA ENCRYPTED BY RANSOMWARE

(71) Applicant: Acronis International GmbH, Schaffhausen (CH)

(72) Inventors: Alexey Kostyushko, Moscow (RU); Stanislav Protasov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 229 days.

(21) Appl. No.: 16/033,588

(22) Filed: Jul. 12, 2018

(65) Prior Publication Data

US 2019/0018961 A1 Jan. 17, 2019

Related U.S. Application Data

(60) Provisional application No. 62/531,430, filed on Jul. 12, 2017.

(51) Int. Cl.
*G06F 21/00* (2013.01)
*G06F 21/56* (2013.01)
(Continued)

(52) U.S. Cl.
CPC ............ *G06F 21/565* (2013.01); *G06F 7/582* (2013.01); *G06F 21/554* (2013.01);
(Continued)

(58) Field of Classification Search
CPC .... G06F 21/565; G06F 21/554; G06F 21/568; G06F 21/602; G06F 7/582; G06F 21/56;
(Continued)

(56) References Cited

U.S. PATENT DOCUMENTS

| | | | | |
|---|---|---|---|---|
| 7,472,384 B1 * | 12/2008 | Beloussov | ............ | G06F 8/656 717/168 |
| 8,751,789 B2 * | 6/2014 | Begum | ............... | H04L 63/0442 713/153 |

(Continued)

FOREIGN PATENT DOCUMENTS

| | | | |
|---|---|---|---|
| CN | 102307189 B | * | 2/2014 |
| GB | 2565185 B | * | 6/2016 |

(Continued)

OTHER PUBLICATIONS

Sajad Homayoun, et al., Know Abnormal, Find Evil: Frequent Pattern Mining for Ransomware Threat Hunting and Intelligence, Sep. 26, 2017, IEEE Transactions on Emerging Topics in Computing , pp. 1-11.*

(Continued)

*Primary Examiner* — Jeffery L Williams
(74) *Attorney, Agent, or Firm* — Arent Fox LLP; Michael Fainberg

(57) ABSTRACT

A technique is described for protecting file data from malicious programs, in particularly, by decrypting data that has been maliciously encrypted by software such as ransomware. The described technique generates a copy of a first block of a plurality of files stored on a computing device, and also intercepts request(s) from a process executing on the computing device to obtain certain types of random data and system entropy, which are recorded. When the system detects that the plurality of files have been encrypted by a malicious program, the described system determines a cryptographic key determined based on the generated copies of the first blocks of the plurality of files and on the recorded random data, and uses that key to decrypt the plurality of files.

18 Claims, 4 Drawing Sheets

(51) Int. Cl.
  *G06F 21/55* (2013.01)
  *G06F 7/58* (2006.01)
  *H04L 29/06* (2006.01)
  *H04L 9/08* (2006.01)
  *G06F 21/60* (2013.01)
  *H04L 9/00* (2006.01)

(52) U.S. Cl.
  CPC .......... *G06F 21/568* (2013.01); *G06F 21/602* (2013.01); *H04L 9/002* (2013.01); *H04L 9/0861* (2013.01); *H04L 63/0428* (2013.01); *H04L 63/145* (2013.01)

(58) Field of Classification Search
  CPC ... G06F 12/1408; H04L 9/002; H04L 9/0861; H04L 63/0428; H04L 63/145
  See application file for complete search history.

(56) References Cited

U.S. PATENT DOCUMENTS

| | | | | |
|---|---|---|---|---|
| 9,319,428 | B2* | 4/2016 | Freeman | G06F 21/554 |
| 9,753,848 | B2* | 9/2017 | Barrall | G06F 12/0246 |
| 10,216,529 | B1* | 2/2019 | Makhov | G06F 9/4411 |
| 10,303,877 | B2* | 5/2019 | Roguine | G06F 21/577 |
| 10,409,986 | B1* | 9/2019 | Natanzon | G06F 21/56 |
| 10,701,104 | B2* | 6/2020 | Malkov | H04L 63/1466 |
| 10,713,361 | B2* | 7/2020 | Strogov | G06F 21/566 |
| 2007/0245154 | A1* | 10/2007 | Akkermans | G06K 9/00885 713/186 |
| 2009/0083521 | A1* | 3/2009 | Sato | G06F 21/14 712/220 |
| 2013/0262866 | A1* | 10/2013 | Gu | H04L 63/0428 713/167 |
| 2014/0244785 | A1* | 8/2014 | Potlapally | H04L 9/0869 709/217 |
| 2016/0173276 | A1* | 6/2016 | Minematsu | G09C 1/00 380/28 |
| 2016/0323358 | A1* | 11/2016 | Malhotra | G06F 16/1774 |
| 2017/0147510 | A1* | 5/2017 | Shields | G06F 21/552 |
| 2019/0171826 | A1* | 6/2019 | Lee | G06F 21/604 |
| 2020/0257799 | A1* | 8/2020 | Saxe | G06F 21/562 |

FOREIGN PATENT DOCUMENTS

| | | | | | |
|---|---|---|---|---|---|
| GB | 2565185 | A | * | 2/2019 | H04L 9/3265 |
| GB | 2565185 | B | * | 11/2019 | H04L 9/0894 |

OTHER PUBLICATIONS

Henry Corrigan-Gibbs, et al., "Recommendations for Randomness in the Operating System", 2016-02-21T08, http://carbondate.cs.odu.edu/#https://www.usenix.org/system/files/conference/hotos15/hotos15-paper-corrigan-gibbs.pdf, retrieved on Mar. 31, 2020, pp. 1-8, hereinafter Gibbs).*

Recommendation for Cryptographic Key Generation by Elaine Barker et al., National Institute of Standards and Technology, Dec. 2012, 26 pages.

* cited by examiner

METHOD FOR DECRYPTING DATA ENCRYPTED BY RANSOMWARE

CROSS-REFERENCE TO RELATED APPLICATIONS

This application claims the benefit of U.S. Provisional Application No. 62/531,430, filed Jul. 12, 2017, which is incorporated herein by reference.

FIELD OF TECHNOLOGY

The present disclosure relates generally to the field of data security, more specifically, to systems and methods for restoring data maliciously encrypted by ransomware and other cyberattacks.

BACKGROUND

One issue that affects the operations of computer systems and file systems is the prevalence of malicious software. Malicious software, also referred to as "malware," can infiltrate or damage a computer system by corrupting software code, resulting in abnormal operation or even termination of applications and the operating system. One type of malware known as "ransomware" takes block access to data on a computer system until a ransom is paid. Ransomware typically uses cryptography techniques to encrypt a computer system's files (such as a computer's Master File Table or the entire hard drive), thereby making them inaccessible until decrypted upon payment of the ransom. Ransomware can alter the file system in other ways, for example, by hiding the files, modifying the access rights of the files, moving the files to a hidden location in the file system, scrambling the names of files, or some combination thereof.

Known approaches for protecting a computer system against ransomware and other malware generally involve periodic data archiving and protection in case malicious programs are detected attempting to alter the file system. One of these approaches is a backup of the entire hard drive, which typically involves copying of the hard drive contents onto some other medium (such as another hard disk drive, a DVD ROM, a DVD RAM, a flash disk, etc.). Another approach is to proactively back up files or create file snapshots whenever a suspicious program attempts to make changes to user files.

However, these approaches have several drawbacks, including the least of which is the high cost in time and resources of the user and the computer system on which they are applied. Backing up all of the user's data requires a significant amount of disk space to store the created copies, and creates a load on the computer system by consuming processor power and RAM, which ultimately leads to a decrease in productivity.

Accordingly, there is a need in the art for systems and methods for more efficiently protecting data against malicious programs in ways that that improve resource consumption of the computer system compared to known techniques.

SUMMARY

Thus, a system and method is disclosed herein for protecting file data from malicious programs, and, more particularly, for decrypting data that has been maliciously encrypted by software such as ransomware. Aspects of the present disclosure provide techniques for monitoring operations of a computer system, which may be infected by ransomware, and attempt to determine an encryption key used by the ransomware based on the monitored operations. For example, the described technique may intercept explicit requests to random number generator libraries, or intercept requests to retrieve system information which have been determined as commonly-used seeds for pseudorandom data, such as process information, timestamps, hardware identifiers (e.g., serial numbers). By accumulating a sufficiently large amount of monitored information, the described system may perform a successful crypto-attack on the encrypted data and restore encryption keys used by the ransomware.

According to one aspects of the present disclosure, a method for protecting file data from malicious programs. The method further includes generating a copy of a first block of a plurality of files stored on a computing device, intercepting a request from a process executing on the computing device to obtain random data, and recording the random data returned by the intercepted request. The method further includes, responsive to detecting that the plurality of files have been encrypted by a malicious program, decrypting the plurality of files using a cryptographic key determined based on the generated copies of the first blocks of the plurality of files and on the recorded random data.

In another aspect, the data blocks of the plurality of files encrypted by the malicious program have been replaced by blocks of ciphertext, and the method further includes performing crypto-analysis on the blocks of ciphertext using the recorded random data returned by the intercepted request.

In another aspect, the method further includes generating a candidate key based on the recorded random data returned by the intercepted request, and determining the candidate key is the cryptographic key for decrypting the plurality of files based on a comparison using the copies of the first block of the plurality of files.

In another aspect, determining the candidate key is the cryptographic key for decrypting the plurality of files based on the comparison using the copies of the first block of the plurality of files further includes: generating ciphertext from the copy of the first block of at least one of the plurality of files using the candidate key, and determining whether the generated ciphertext matches a corresponding ciphertext created by the malicious program.

In another aspect, the request to obtain random data further comprises a system call to generate a pseudo-random number.

In another aspect, the first block of the plurality of files are copied periodically.

In another aspect, the generated copies are copies of initial blocks of pre-determined system files of the computing device.

In another exemplary aspect of the present disclosure, a system for protecting file data from malicious programs is provided. The system includes a storage device configured to store a plurality of files, and a hardware processor. The hardware processor is configured to generate a copy of a first block of a plurality of files stored on a computing device, intercept a request from a process executing on the computing device to obtain random data, and record the random data returned by the intercepted request. The hardware processor is further configured to, responsive to detecting that the plurality of files have been encrypted by a malicious program, decrypt the plurality of files using a cryptographic key determined based on the generated copies of the first blocks of the plurality of files and on the recorded random data.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for protecting file data from malicious programs. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Certain aspects of the present disclosure provide various methods that in certain circumstances allow a user to restore or decrypt data (e.g., a disk with data) of the user which has been encrypted by ransomware. The various methods employ crypto-attack techniques for the encrypted data, optionally in combination with various data backup policies. The technical effect of the present disclosure is the decryption of data that was encrypted or otherwise made inaccessible by malicious software. As described in greater detail below, the method of decryption of encrypted user data, based on the use of crypto-attack, may include regular (periodic), partial backup of data blocks (for example, the initial block of each file), and the detection and storage of well-known data, the contents of which can be compared with the maliciously encrypted data. The described technique further includes tracking and interception in the system of any requests to receive any kind of random and pseudo-random numbers that can be used by ransomware as a key expansion function for generating encryption keys.

Figure 1:
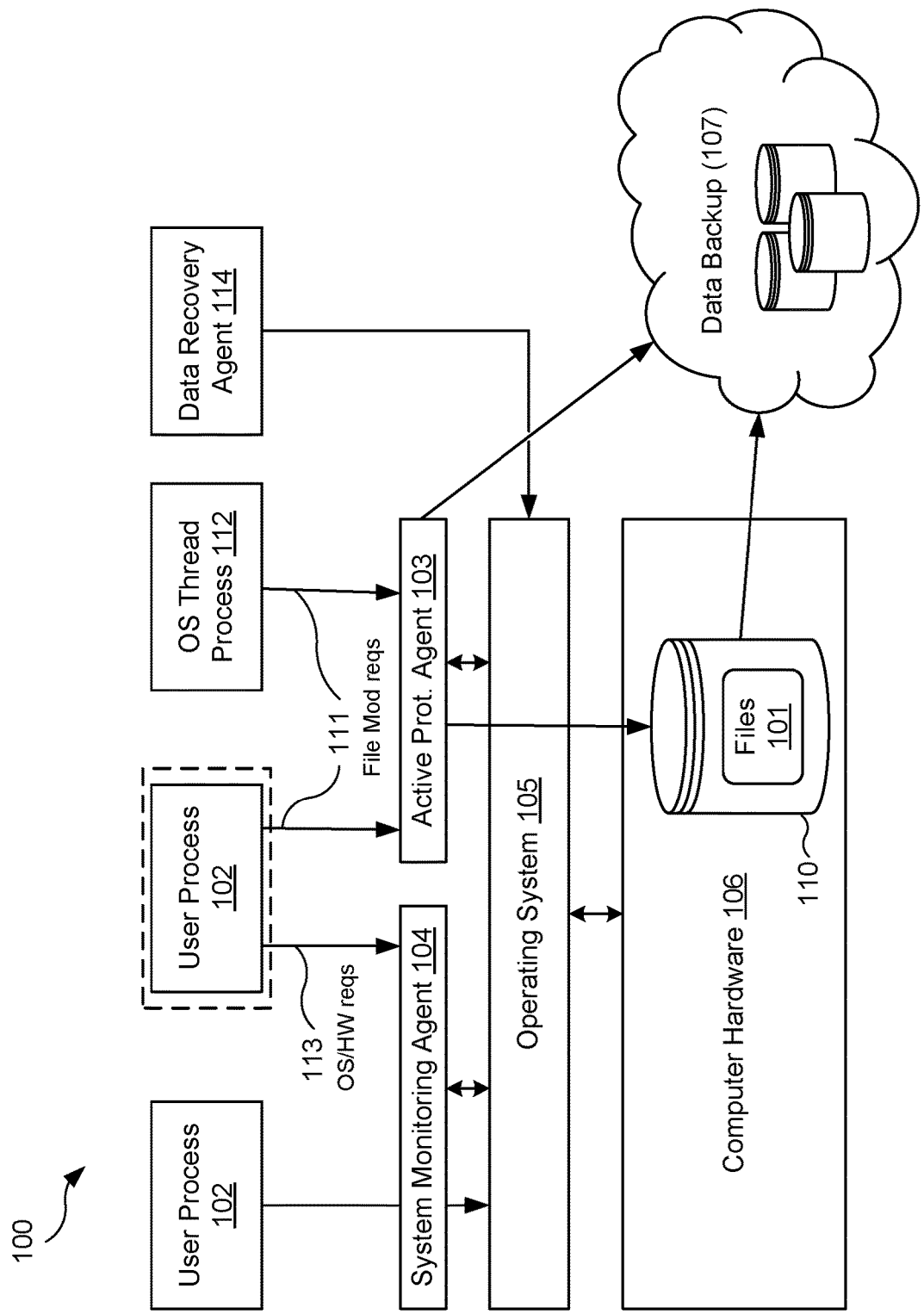
FIG. 1 is a block diagram illustrating a system for protecting file data from malicious programs, according to an exemplary aspect.

FIG. 1 is a block diagram illustrating a system 100 for protecting file data from malicious programs according to an exemplary aspect. The system 100 includes computer hardware 106 that includes a storage device 110 storing a plurality of files 101. The system 100 supports execution of one or more user processes 102 executing in an operating system (OS) environment provided by an operating system 105. The system 100 further supports execution of one or more OS thread processes 112 in parallel with the user processes 102.

The user processes 102 and OS thread processes 112 may access the files 101 via a filesystem layer (not shown) provided by the operating system 105. For example, user processes 102 and OS thread processes 112 may request to read and write data to the storage device 110 via a file system request 111.

One of the user processes 102 (or OS threads 112) may be instances of malicious software that blocks access to the files 101 using cryptography. This is depicted in FIG. 1 by a dashed outline of a user processor 102. In general, such malicious software or malware generates a random encryption key and encrypts the files 101 with it. The malicious software can use a variety of encryption schemes, categorized by the following three approaches.

In one approach, the malicious software may encrypt the files 101 using an asymmetric key. This form is encryption may be considered the most persistent, and its reverse decryption is generally considered nearly impossible. At the same time, it has been determined that creators of malicious software disfavor encrypting the user's files using asymmetric keys because the data encryption occurs rather slowly (e.g., about 1 MB/s). Accordingly, such a process, which consumes a significant fraction of the power of the CPU and records on the disk quite slowly, can be easily detected on the victim's machine.

In a second approach, the malicious software may encode the files 101 using primitive encryption methods that do not use specific cryptographic algorithms. Rather, in this approach, the malicious software uses techniques of permutation or replacing symbols, for example, as seen in transposition ciphers or substation ciphers. For such an approach, a restoration tool may be created (e.g., by an antivirus crypto-analyst) based on reversing one or more malware samples.

In a third approach, the malicious software may encrypt the files 101 using symmetric-key encryption. It has been determined that this approach is most popularly used by ransomware for a number of reasons. In this approach, the malicious process 102 encrypts the data of one or more files 101 using a symmetric key, and the symmetric key itself is encrypted with an asymmetric key to make the symmetric key inaccessible. Encryption is described in greater detail in conjunction with FIG. 2.

Figure 2:
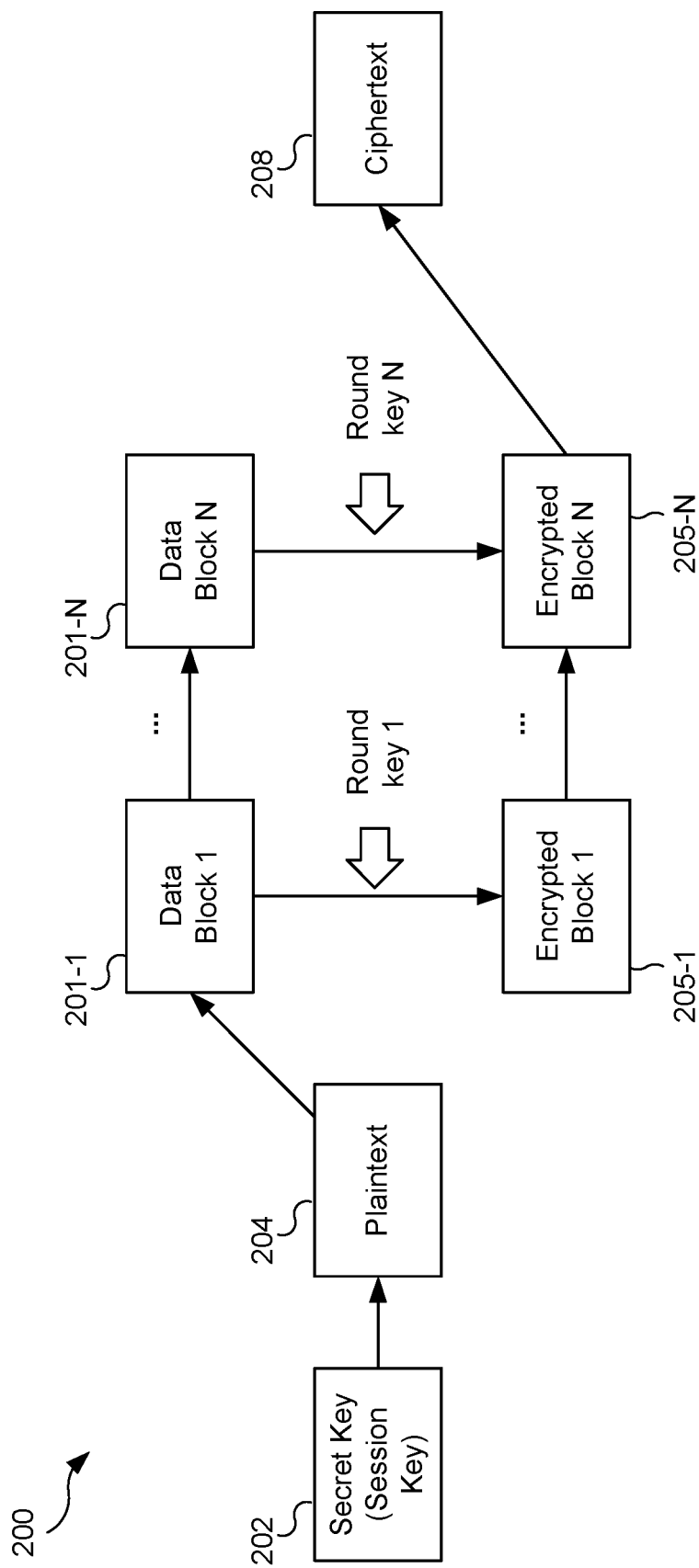
FIG. 2 is a block diagram depicting one scheme for encrypting data that may be used by malicious programs.

FIG. 2 is a block diagram depicting one scheme 200 for encrypting data that may be used by malicious programs. In general, the process of encryption encodes the original input data (referred to as "plain text" or "plaintext") into a form of encrypted output data (referred to as "ciphertext" or "cyphertext"). The example scheme 200 is a block cipher described in broad terms, and it is understood that other encryption schemes (include stream ciphers) and algorithms may be used in aspects of the present disclosure. Example encryption algorithms that may be used by ransomware include Advanced Encryption Standard (AES) and Data Encryption Standard (DES).

In one exemplary aspect, an encryption scheme 200 includes dividing data (e.g., a file) into fragments or blocks, and encrypting the data in blocks in different cycles of processing. As shown in FIG. 2, a file has been divided into a plurality of data blocks 201-1 to 201-N. For the processing of each data block 201, an original secret key referred to as a session key 202 is modified each time. That is, the block is encrypted with a so-called round key. In some aspects, for the first data block, the round key is the session key, and for subsequent blocks, the round key is obtained by modifying the original key (e.g., by an encryption algorithm) or derived at least in part from the original key (e.g., using a key schedule.) Thus, each data block 201 is encrypted with its own round key into an encrypted block 205, such that the resultant ciphertext 208 cannot be decrypted since it is impossible to compute the key by simply mapping the original plaintext (e.g., data block 201-$i$) and the resulting ciphertext (e.g., encrypted block 205-$i$).

In some aspects, to create a session key 202 for use in data encryption, malicious software typically use any random number that the software receives from the user's system. For example, the malicious software can randomly generate an encryption key based on values obtained using a random number generator (RNG), pseudorandom number generator (PRNG), random bit generator (RGB), a strong cryptographic random number generator (CRNG), or other similar algorithm. A pseudorandom number generator is a computer algorithm that produces data (e.g., sequence of numbers) that appear random, i.e., whose properties approximate the properties of sequences of truly random numbers. In other aspects, the malicious software may use a key that is generated deterministically using a key derivation function and a passphrase.

In one aspect, a malicious software application may be configured to generate a bit string value K, which is either a symmetric key itself or a random value to be used as input to an asymmetric-key pair generation algorithm. The value K may be produced as a function of two sequences of bits f(U,V). For example, the function f may be a bitwise XOR operation, as represented by the relationship:

$$K = U \oplus V$$

The value U may be a bit string output from a random number generator or pseudorandom number generator, and the value V is some bit string value that is determined independently of the value U (and may have a same length as U). Assuming the value U is obtained from a RNG or similar algorithm, example values for the independently-determined value V include: some pre-determined constant value (e.g., a string of binary zeroes), a key value obtained using a key-derivation method, a key value independently generated using a cryptographic module, some value produced by hashing another bit string value (e.g., V-prime) truncated to an appropriate length, or some value obtained using values from the computer system associated with the entropy of the computer system caused during normal operations of the computer system (e.g., current time, file creation time, etc.).

The value K obtained may be used as a seed to generate a cryptographic key directly, or also be used as input to additional algorithmic schemes, such as key agreements, key derivation functions (KDF), extract-then-expand approaches (e.g., HKDF), and so forth. In some aspects, the key derivation functions may be based on a message authentication code system, such as HMAC (keyed-hash message authentication code, or hash-based message authentication code) or CMAC (cipher-based message authentication code). In some aspects, the malicious software application may be configured to incorporate cryptographic libraries, such as the open-source project OpenSSL or the Windows®-specific library CryptoAPI (Cryptographic Application Programming Interface) made available by Microsoft, Inc. In other aspects, the malicious software application may use an independent or custom implementation of cryptographic algorithms.

Referring back to FIG. 1, in one exemplary aspect of the present disclosure, the system 100 includes a system monitoring agent 104 configured to collect and track information in the system that might be used by suspicious processes to create encryption keys. In doing so, the system monitoring agent 104 may be able to accumulate a sufficiently large amount of data that will allow for a successful crypto-attack or cryptanalysis on the encrypted data and restore the encryption keys (e.g., session key and derivatives of the round key).

The system monitoring agent 104 may be configured to monitor and save any requests (113) for random or pseudorandom numbers from the system. Such requests 113 may be made by innocent user processes or suspicious user processes alike. In some aspects, the system monitoring agent 104 may detect a user process 102 invoking system calls or application programming interface (API) calls to library functions that provide random or pseudorandom data from the operating system 105. For example, the system monitoring agent 104 may detect invocation of a built-in Windows® function CryptGenRandom( ) for generating pseudorandom numbers, the functions rand( ), random( ), drand48( ) in Unix™-like operating systems, and other analogous, suitable functions on other operating systems. In other aspects, the system monitoring agent 104 may detect a user process 102 attempting to access special files exposed by the operating system 105 that allow access to environmental noise collected from device drivers and other sources, and which can serve as pseudorandom number generators. In some aspects, the system monitoring agent 104 may detect calls to entropy-suppling system calls through which user processes 102 can obtain entropic or random data without having to open and read from randomness pseudo-devices. For example, in aspects in which the computing system is a Linux-based system, the system monitoring agent 104 may detect when a user process attempts to access the special device file /dev/random (or/dev/urandom, or/dev/arandom) exposed by the Linux operating system to allow access to environmental noise collected from device drivers and other system sources.

In some aspects, the system monitoring agent 104 may detect when a user process 102 obtains certain arbitrary metadata stored throughout the computing system 100, which have been determined based on prior analysis to be commonly used for generating encryption keys. For example, the system monitoring agent 104 may detect and save when a user process 102 requests (113) for hardware identifiers of devices in the computer hardware 106, such as a serial number of a hard disk drive, network interface card, and PCI interface or device, USB interface or device. In other examples, the system monitoring agent 104 may detect when a user process 102 requests file metadata of one or more files stored in the system, such metadata file creation times (e.g., timestamp), file names, and data from the file header. In some aspects, the system monitoring agent 104 may be configured to intercept requests by a user process 102 to retrieve metadata related to one or more processes or threads executing in the system, metadata such as process identifiers (PID) or thread identifiers (tid). In some aspects, the system monitoring agent 104 may be configured to intercept requests (e.g., system calls) by a user process 102 to retrieve metadata related to a registry or configurations database of the system, such as key-value pairs, global unique identifiers (GUIDs) having 128-bit long sequences, etc. In some aspects, the system monitoring agent 104 may be configured to intercept requests by a user process to retrieve from performance counters exposed by the operating system 105 indicating how the operating system, application, service, or driver(s) are performing, such as performance counters related to page faults, interrupts, and IOPS (e.g., input/output, IO bytes per second). As noted above, it is possible that the ransomware receives these numbers to generate an encryption key (e.g., used as the bit strings U and/or V, mentioned above). By intercepting these requests, the probability of recovering the key(s) with which the user data was encrypted is increased and, thus, increasing the success of a crypto-attack, as described in greater detail below.

In one aspect, the system 100 further includes an active protection agent 103 configured to back up files 101 to other data storage, such as data backup 107. In some aspects, the active protection agent 103 may be configured to perform continuous copying of initial blocks ("first blocks") of files 101. The copies save the contents of the files 101 and may be used for comparison with a corresponding encrypted fragment (e.g., encrypted block 205), which will further increase the probability of finding the encryption key.

In some aspects, the active protection agent 103 may be configured to detect and store copies of "well-known" data, the contents of which can be used to compare with the maliciously encrypted data. For example, the active protection agent 103 may detect system files, library files (e.g., dynamic linked library or DLL files), or other files containing data characterized as well-known or common. In some aspects, the active protection agent 103 may store entire copies or just copies of initial blocks of files 101 matching from a list of predetermined system files (e.g., operating system files and installed programs) of the computing device.

In other aspects of the present disclosure, the active protection agent 103 may be configured to perform a technique for "active protection" of the files 101 from malicious programs, in which the agent quickly preventatively backs up files 101 (or creates a snapshot of the file) in case of detection of any suspicious processes that try to make changes to a file 101. The active protection agent 103 may be configured to monitor all processes 102, 112 that attempt to make changes to the user files 101. For example, the agent 103 may detect any modification requests (111) to a file, including requests to delete, overwrite, or truncate a file, and in response execute a copy-on-write snapshot of the file, thereby saving the file version before modification by the request.

The system 100 includes a data recovery agent 114 configured to retrieve the saved information provided by the system monitoring agent 104 and the copies of data blocks made by the active protection agent 103. For those data of the user that for some reason cannot be protected with "active protection", the system 100 applies a set of operations that will allow the data recovery agent 114 to produce a successful crypto attack if these data are encrypted. In some aspects, the data recovery agent 114 may be configured to use this data to determine the (symmetric) encryption key used by malicious software to encrypt one or more files 101.

In one aspect, the data recovery agent 114 may be configured to identify, based on a software signature, that an application utilizes a static implementation of a known cryptographic library (e.g., OpenSSL) and intercept (i.e., "see") the generated keys for the known libraries. In some implementations, the data recovery agent 114 may match the software signature with a previously-known signature associated with a virus or malware, or with a previously-known signature associated with any application that uses certain, known cryptographic libraries, or with a previously-known signature of portions of software code and program files that are associated the libraries themselves.

In some aspects, if no such signature match is found, the data recovery agent 114 may act based on the conclusion that a potential malicious application is using a non-standard or unknown implementation of cryptographic functionality. In such an approach, the data recovery agent 114 may be configured to intercept OS services by standard entropy sources and random number generators (e.g., /dev/random in Linux, or CryptoGenRandom( ) in Windows) to determine one of the bit string values that are parameters of a function used to create the key (i.e., K=f(U,V)), specifically, the bit string value U.

Additionally, a crypto-attack may be performed using reverse engineering of a ransomware sample to determine the algorithm for generating the bit string value V and the encryption key used by the malware to maliciously encrypt the user data. In one implementation, the data recovery agent may query a database of pre-determined malware signatures for a match with the malware currently infecting the computing system. The database of pre-determined malware signature also includes predetermined analysis regarding the corresponding malware's cryptographic functionality, i.e., how the malware generates its encryption key, what hash functions are used, what random data or system entropy data is used for the bit string values U and/or V, etc.

The search space of the bit string value V can depend on data that is unknown after infection (i.e., the exact time of file encryption, the values of the system counters, the process or thread identifiers that made the encryption), but may be deducted or predicted using the captured data values at or around the time of infection. That is, it has been determined that these parameters are not usually random, but rather, they typically grow monotonically or have a similarly extrapolate-able behavior. By periodically logging such values and intercepting request for their receipt from malware to the operating system 105, the data recovery agent 114 is able to define small ranges of values (or exact values) that can be searched using a brute force methodology.

In one aspect, the data recovery agent 114 is configured to sort this whole space of values, formed according to the reverse engineering of how a previously-known malware sample generates the bit string value V, combine such value with the intercepted value U, obtain the key value K, and generate a key. In some examples, using the logged values and intercepted requests, the described system may be able to limit the range of possible bit string values to approximately $2^{40}$ to $2^{60}$ values, which is considered computationally insecure from a brute force attack using current computing resources.

According to one aspect, the data recovery agent 114 may define a limited range of possible values for a bit string value V using the intercepted random data. For example, based on a determination that the malicious encryption began at approximately time X, the data recovery agent 114 retrieves the intercepted random data that was logged within a threshold proximity to time X, such as the values of performance counters at that time, the values of process or thread IDs at that time, etc. The data recovery agent 114 then generates a range of candidate values for the bit string V using an extrapolation of the intercepted and logged random data. For example, the data recovery agent 114 may generate a range of candidate values for the bit string V that starts at an intercepted value of a process identifier at the time X. Using the assumption that the process identifiers increment monotonically, the data recovery agent 114 may end the range of candidate values at an intercepted value of another processor identifier at a subsequent time Y after commencement of the malicious encryption. Using this generated range of values, the data recovery agent 114 may iteratively test different values of the bit string value V by combining it with the previously intercepted value of bit string U (e.g., intercepted call for/dev/random or CryptoGenRandom( )) using a bit-wise XOR operation (or other function), obtain a key value K, and generate a candidate key. In some aspects, the obtained key value K may be the encryption key itself, or may be input to a key derivation function (KDF) that outputs the candidate encryption key. That is, the data recovery agent 114 may perform an exhaustive key search using the generated range of values by attempting to guess the key which is created from the password using the KDF.

In some aspects, in order to determine whether an encryption key has been correctly guessed, the data recovery agent 114 may encrypt a first block from a unit of user data and splice the encrypted block with the block encrypted by the ransomware. If they are equal, the data recovery agent 114 may determine that the encryption key has been correctly picked up. It is noted that the described system may have access to the first block because the described system is configured to always back up the beginning of any file.

While aspects of the present disclosure have described the operations as being performed by the data recovery agent 114, it is understood that aspects may be extended to a distributed system, in which one or more operations are offloaded to another computing system, multiple computing systems (e.g., cluster), or a cloud computing service. For example, the data recovery agent 114 may provide a cloud computing service for a security service with the range of candidate values for the bit string V (or even the raw intercepted requests and logged data values themselves), and the cloud computing service generates and checks candidate encryption keys using an efficient parallelized operation. In another example, the data recovery agent 114 may provide the cloud computing service with the range of candidate keys as well as one or more first blocks of user data to be used to check the encryption key with.

Figure 3:
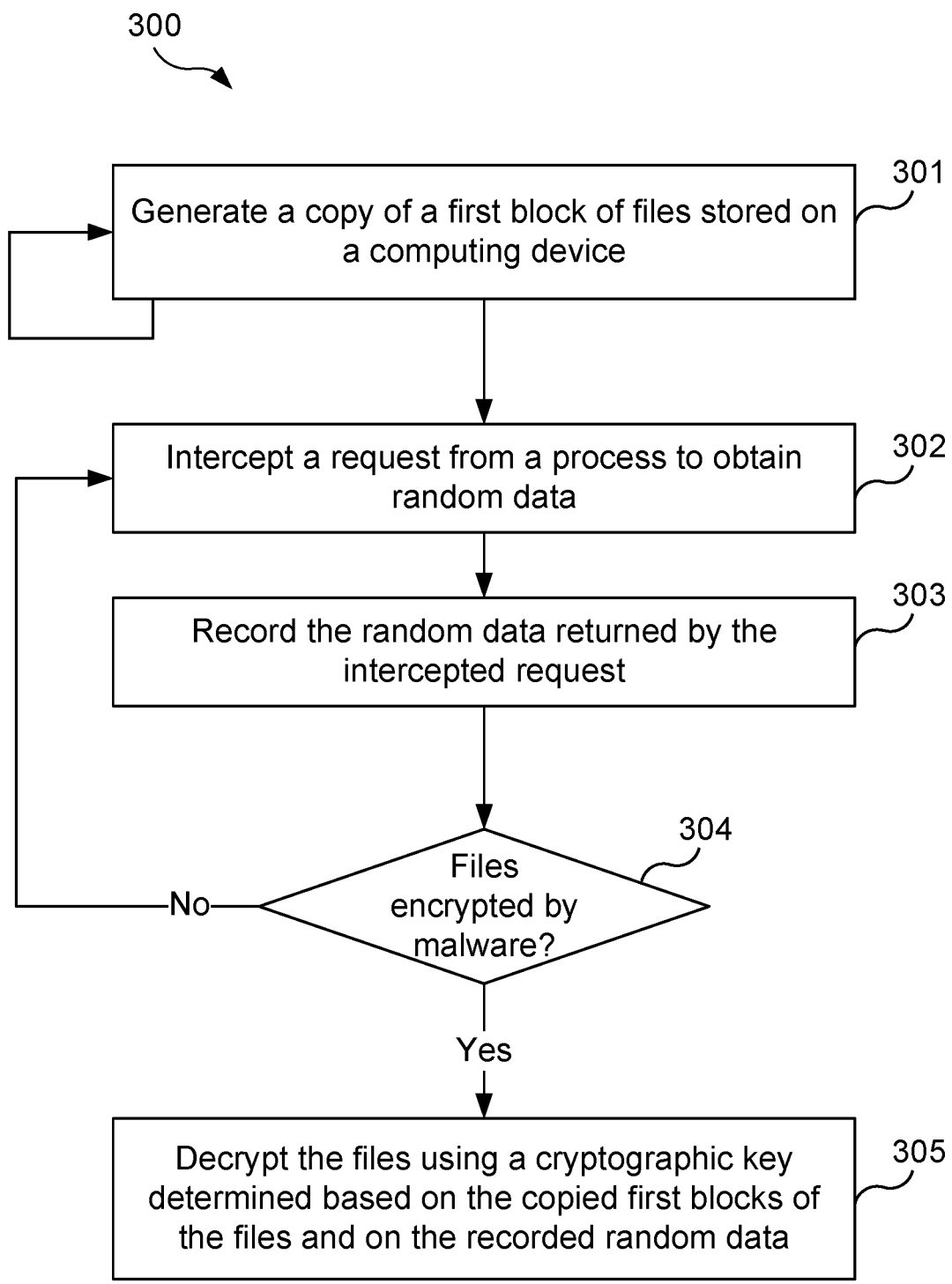
FIG. 3 is a flowchart illustrating a method for protecting file data from malicious programs according to an exemplary aspect.

FIG. 3 is a flowchart illustrating a method 300 for protecting file data from malicious programs according to an exemplary aspect. It is noted that the following description of the exemplary method makes reference to the system and components described above.

The method 300 begins at step 301, in which the agent 103 generates a copy of a first (e.g., initial) block of a plurality of files 101 stored on a computing device. In some aspects, the first blocks of the plurality of files are copied periodically and continuously throughout operation of the system 100. In some aspects, the generated copies are copies of initial blocks of pre-determined system files of the computing device.

At step 302, the system monitoring agent 104 may intercept one or more requests from a process executing on the computing device to obtain random data. For example, the request to obtain random data may be a system call to generate a pseudo-random number. At step 303, the system monitoring agent 104 may record the random data returned by the intercepted request.

At step 304, the data recovery agent 114 may whether the plurality of files have been encrypted by a malicious program. In some aspects, the data recovery agent 114 may monitor user processes 102 and OS thread processes 112 executing in the operating system 105 and check them against a database of known malicious software. In other aspects, the data recovery agent 114 may monitor the changes the processes make to the files 101 to see if the files are being encrypted. In yet other aspects, the data recovery agent 112 may launch based on an indication from the user (e.g., user input).

At step 305, responsive to detecting that the plurality of files have been encrypted by a malicious program, the data recovery agent 114 decrypts the plurality of files using a cryptographic key determined based on the generated copies of the first blocks of the plurality of files and on the recorded random data. In some cases, the data blocks of the plurality of files encrypted by the malicious program have been replaced by blocks of ciphertext. The data recovery agent 114 may then perform cryptanalysis on the blocks of ciphertext using the recorded random data returned by the intercepted request.

In some aspects, the data recovery agent 114 may generate one or more candidate keys based on the recorded random data, and determine one of the candidate keys is the cryptographic key for decrypting the plurality of files based on a comparison using the copies of the first block of the plurality of files. In some aspects, the data recovery agent 114 may generate ciphertext from the copy of the first block of at least one of the plurality of files using the candidate key, and then determine whether the generated ciphertext matches a corresponding ciphertext created by the malicious program.

Figure 4:
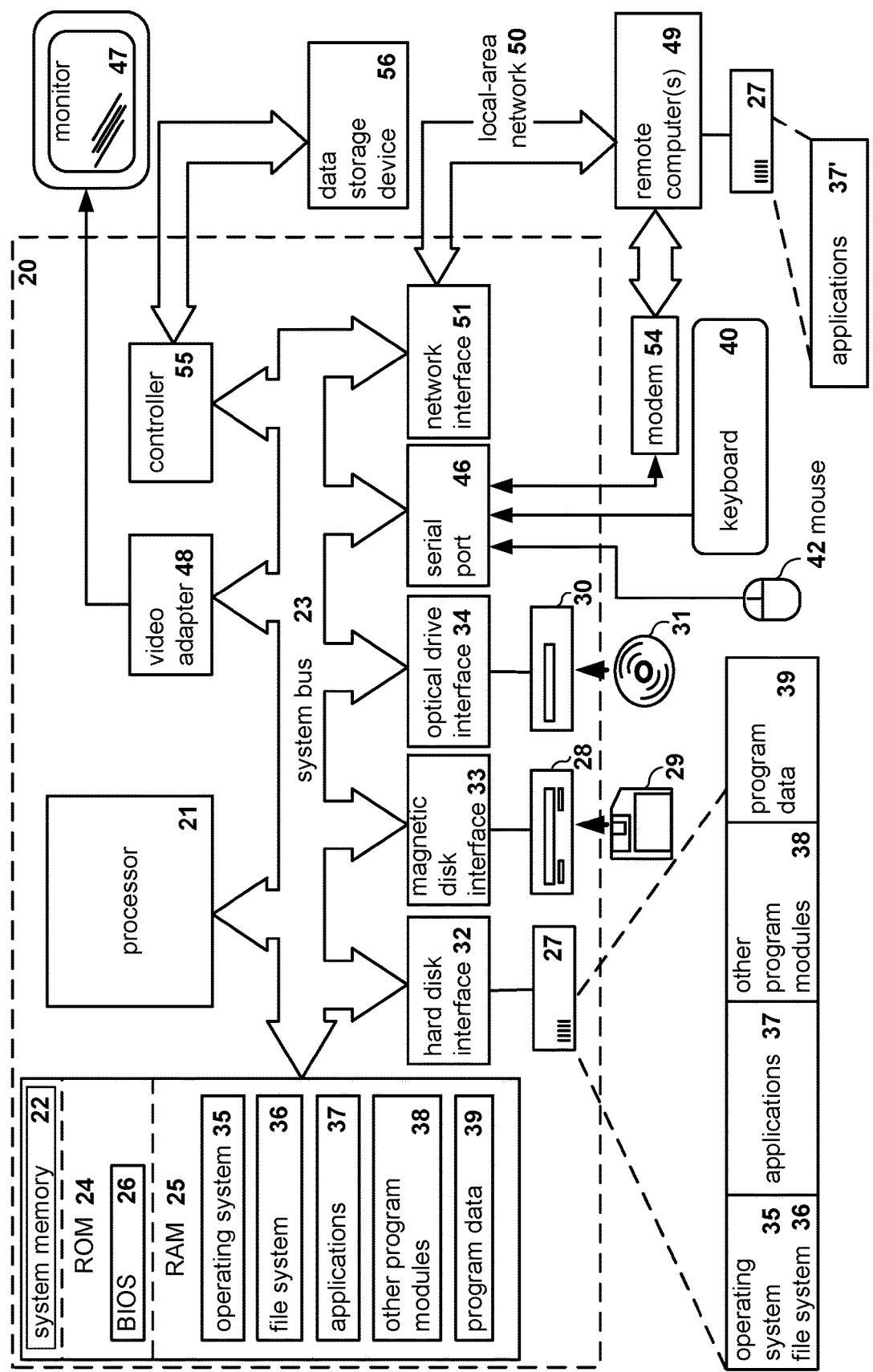
FIG. 4 is a block diagram of a general-purpose computer system on which the disclosed system and method can be implemented according to an exemplary aspect.

FIG. 4 is a block diagram illustrating a general-purpose computer system 20 on which aspects of systems and methods for scanning web pages may be implemented in accordance with an exemplary aspect. It should be noted that the computer system 20 can correspond to the system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for protecting file data from malicious programs, the method comprising:
   generating a copy of a first block of a plurality of files stored on a computing device;
   intercepting a request, from a process executing on the computing device, for a randomized value;
   recording, on the computing device, the randomized value returned by the intercepted request;
   detecting that the plurality of files have been encrypted by a malicious program wherein the plurality of files have been encrypted using a symmetric key (K) that is a result of an XOR function between the randomized value (U) and a string value (V);
   predicting the string value (V) associated with the malicious program; and decrypting the plurality of files encrypted by the malicious program using a cryptographic key determined based on the generated copy of the first block of the plurality of files, the string value (V) and the recorded randomized value (U).

2. The method of claim 1, further comprising:
generating a candidate key based on the recorded randomized value returned by the intercepted request;
determining the candidate key is the cryptographic key for decrypting the plurality of files based on a comparison using the copy of the first block of the plurality of files.

3. The method of claim 2, wherein determining the candidate key is the cryptographic key for decrypting the plurality of files based on the comparison using the copy of the first block of the plurality of files further comprises:
generating ciphertext from the copy of the first block of at least one of the plurality of files using the candidate key; and
determining whether the generated ciphertext matches a corresponding ciphertext created by the malicious program.

4. The method of claim 1, wherein the request for the randomized value further comprises a system call to generate a pseudo-random number.

5. The method wherein the first block of the plurality of files is copied periodically.

6. The method of claim 1, wherein determining K comprises:
determining whether the malicious program is identified in a database of malware signatures, wherein the database comprises information on hash functions and types of randomized data and entropy data utilized by each respective malware in database;
in response to determining that the malicious program is identified in the database, retrieving for the malicious program information comprising possible values of V; and
determining and verifying 1 for each possible value of V identified in the retrieved information, wherein the K that successfully decrypts the plurality of files is the cryptographic key.

7. The method of claim 6, further comprising:
in response to determining that the malicious program is not identified in the database, determining a time when encryption of the plurality of files began by the malicious program and a process identifier at the time of encryption;
determining at subsequent time during the encryption another process identifier, wherein process identifiers increment monotonically;
setting a range for the possible values of V between a value of the process identifier and a value of the another process identifier; and
determining and verifying K for each possible value of V identified in the range, wherein the K that successfully decrypts the plurality of files is the cryptographic key.

8. A system for protecting file data from malicious programs, comprising:
a hardware processor configured to:
generate a copy of a first block of a plurality of files stored on a computing device;
intercept a request, from a process executing on the computing device, for a randomized value;
record, on the computing device, the randomized value data returned by the intercepted request;
detect that the plurality of files have been encrypted by a malicious program, wherein the plurality of files have been encrypted using a symmetric key (K) that is a result of an XOR function between the randomized value (U) and a string value (V);
predict the string value (V) associated with the malicious program; and
decrypt the plurality of files encrypted by the malicious program using a cryptographic key determined based on the generated copy of the first block of the plurality of files, the string value (V) and the recorded randomized value (U).

9. The system of claim 8, wherein the hardware processor is further configured to:
generate a candidate key based on the recorded randomized value returned by the intercepted request; and
determine the candidate key is the cryptographic key for decrypting the plurality of files based on a comparison using the copy of the first block of the plurality of files.

10. The system of claim 9, wherein the processor configured to determine the candidate key is the cryptographic key for decrypting the plurality of files based on the comparison using the copy of the first block of the plurality of files is further configured to:
generate ciphertext from the copy of the first block of at least one of the plurality of files using the candidate key; and
determine whether the generated ciphertext matches a corresponding ciphertext created by the malicious program.

11. The system of claim 8, wherein the request for the randomized value further comprises a system call to generate a pseudo-random number.

12. The system of claim 8, wherein the first block of the plurality of files is copied periodically.

13. The system of claim 8, wherein the hardware processor is configured to determining K by:
determining whether the malicious program is identified in a database of malware signatures, wherein the database comprises information on hash functions and types of randomized data and entropy data utilized by each respective malware in database;
in response to determining that the malicious program is identified in the database, retrieving for the malicious program information comprising possible values of V; and
determining and verifying K for each possible value of V identified in the retrieved information, wherein the K that successfully decrypts the plurality of files is the cryptographic key.

14. The system of claim 13, wherein the hardware processor is further configured to:
in response to determining that the malicious program is not identified in the database, determine a time when encryption of the plurality of files began by the malicious program and a process identifier at the time of encryption;
determine at subsequent time during the encryption another process identifier, wherein process identifiers increment monotonically;
set a range for the possible values of V between a value of the process identifier and a value of the another process identifier; and
determine and verify K for each possible value of V identified in the range, wherein the K that successfully decrypts the plurality of files is the cryptographic key.

15. A non-transitory computer readable medium storing computer executable instructions for protecting file data from malicious programs, including instructions for:

generating a copy of a first block of a plurality of files stored on a computing device;

intercepting a request, from a process executing on the computing device, for a randomized value;

recording, on the computing device, the randomized value returned by the intercepted request;

detecting that the plurality of files have been encrypted by a malicious program, wherein the plurality of files have been encrypted using a symmetric key (K) that is a result of an XOR function between the randomized value (U) and a string value (V);

predicting the string value (V) associated with the malicious program; and decrypting the plurality of files encrypted by the malicious program using a cryptographic key determined based on the generated copy of the first block of the plurality of files, the string value (V) and the recorded randomized value (U).

16. The non-transitory computer readable medium of claim 15, further storing instructions for:

generating a candidate key based on the recorded randomized value returned by the intercepted request;

determining the candidate key is the cryptographic key for decrypting the plurality of files based on a comparison using the copy of the first block of the plurality of files.

17. The non-transitory computer readable medium of claim 16, wherein the instructions for determining the candidate key is the cryptographic key for decrypting the plurality of files based on the comparison using the copy of the first block of the plurality of files further comprises instructions for:

generating ciphertext from the copy of the first block of at least one of the plurality of files using the candidate key; and determining whether the generated ciphertext matches a corresponding ciphertext created by the malicious program.

18. The non-transitory computer readable medium of claim 15, wherein the request for the randomized value further comprises a system call to generate a pseudo-random number.

* * * * *